US009654236B2

(12) United States Patent
Jeong et al.

(10) Patent No.: US 9,654,236 B2
(45) Date of Patent: *May 16, 2017

(54) METHOD AND APPARATUS FOR CONFIGURING CONFIGURATION INFORMATION AT USER EQUIPMENT IN A MOBILE COMMUNICATION SYSTEM

(71) Applicant: Samsung Electronics Co., Ltd., Suwon-si (KR)

(72) Inventors: Kyeong-In Jeong, Gyeonggi-do (KR); Gert Jan Van Lieshout, Middlesex (GB); Hyo-Jin Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,038

(22) Filed: Feb. 29, 2016

(65) Prior Publication Data

US 2016/0182166 A1     Jun. 23, 2016

Related U.S. Application Data

(63) Continuation of application No. 14/149,693, filed on Jan. 7, 2014, now Pat. No. 9,276,715.

(30) Foreign Application Priority Data

Jan. 7, 2013    (KR) ........................ 10-2013-0001750

(51) Int. Cl.
*H04B 17/373*    (2015.01)
*H04L 5/00*    (2006.01)
*H04B 7/024*    (2017.01)

(52) U.S. Cl.
CPC ............. *H04B 17/373* (2015.01); *H04L 5/00* (2013.01); *H04L 5/0035* (2013.01); *H04L 5/0057* (2013.01); *H04B 7/024* (2013.01)

(58) Field of Classification Search
CPC ......... H04B 17/373; H04B 7/024; H04L 5/00; H04L 5/0035; H04L 5/0057
(Continued)

(56) References Cited

U.S. PATENT DOCUMENTS 8,670,379 B2 * 3/2014 Yamada ................ H04L 1/0073
370/328
2010/0322145 A1    12/2010 Yu et al.
(Continued)

FOREIGN PATENT DOCUMENTS

KR    10-2012-0037944 A    4/2012

OTHER PUBLICATIONS

Extended European Search Report dated Jul. 7, 2016 in connection with European Application No. 14735299.1, 9 pages.
(Continued)

*Primary Examiner* — Duc C Ho

(57) ABSTRACT

A method for configuring configuration information with a user equipment in a mobile communication system is provided. The method includes determining, upon receipt of a Physical Uplink Control Channel/Sounding Reference Signal (PUCCH/SRS) release request from a lower layer, whether configuration information required for a transmission mode supporting Coordinated Multi-Point (CoMP) has been configured, and if the configuration information has been configured, reconfiguring a setting state of the configuration information.

10 Claims, 4 Drawing Sheets

(58) Field of Classification Search
USPC .................................... 370/329, 252, 328
See application file for complete search history.

(56) References Cited

U.S. PATENT DOCUMENTS

| | | | | |
|---|---|---|---|---|
| 2011/0268087 | A1* | 11/2011 | Kwon | H04L 5/0005 370/331 |
| 2012/0030380 | A1 | 2/2012 | Yanagimachi | |
| 2012/0263068 | A1 | 10/2012 | Morimoto et al. | |
| 2012/0281566 | A1* | 11/2012 | Pelletier | H04W 76/046 370/252 |
| 2013/0258973 | A1* | 10/2013 | Khoshnevis | H04W 72/1226 370/329 |

OTHER PUBLICATIONS

3GPP TS 36.331 V11.2.0, "3rd Generation Partnership Project; Technical Specification Group Radio Access Network; Evolved Universal Terrestrial Radio Access (E-UTRA); Radio Resource Control (RRC); Protocol specification (Release 11)", Dec. 2012, 340 pages.

Alcatel-Lucent, et al., "CoMP Operation and UE Mobility", 3GPP TSG RAN WGI meeting#68 Dresden, Germany, Feb. 6-10, 2012, R1-120496, 5 pages.

Intel Corporation, Discussion on the Management of CoMP Measurement Set, 3GPP TSG-RAN WG1 #68, Dresden, Germany, Feb. 6-10, 2012, R1-120199, 3 pages.

3GPP TSG RAN WG2 Meeting #79; "UE Actions Upon PUCCH/SRS Release Request"; CATT; R2-123379; Aug. 13-17, 2012; 3 pp.

3GPP TSG-RAN WG2 Meeting #65bis; "Clarification on Default Configuration Upon PUCCH/SRS Release Request"; Panasonic, et al; R2-092376; Mar. 23-27, 2009; 2 pp.

International Search Report dated Apr. 11, 2014 in connection with International Application No. PCT/KR2014/000167; 3 pp.

Written Opinion dated Apr. 11, 2014 in connection with International Application No. PCT/KR2014/000167; 5 pp.

* cited by examiner

METHOD AND APPARATUS FOR CONFIGURING CONFIGURATION INFORMATION AT USER EQUIPMENT IN A MOBILE COMMUNICATION SYSTEM

CROSS-REFERENCE TO RELATED APPLICATION(S) AND CLAIM OF PRIORITY

The present application is a continuation of U.S. Pat. No. 9,276,715, which is related to and claims the benefit under 35 U.S.C. §119(a) of a Korean patent application filed in the Korean Intellectual Property Office on Jan. 7, 2013 and assigned Serial No. 10-2013-0001750, the entire disclosure of any of which is incorporated herein by reference into the present disclosure as if fully set forth herein. The present application also incorporates herein by reference in its entirety U.S. Pat. No. 9,276,715, titled "METHOD AND APPARATUS FOR CONFIGURING CONFIGURATION INFORMATION AT USER EQUIPMENT IN A MOBILE COMMUNICATION SYSTEM" and filed on Jan. 7, 2014.

TECHNICAL FIELD

The present disclosure relates to a method and apparatus for configuring configuration information at a User Equipment (UE) in a mobile communication system.

BACKGROUND

In general, mobile communication systems have been developed to provide communication to users, while ensuring the mobility of the users. Owing to the drastic development of technology, the mobile communication systems have reached a development stage in which high-speed data communication service as well as voice communication service can be provided. The 3rd Generation Partnership Project (3GPP) has worked on standardization of Long Term Evolution (LTE) as one of future-generation mobile communication systems. LTE is a technology that enables high-speed packet communication at up to 100 Mbps higher than current available data rates, with the aim at commercialization by around 2010. Compared to voice service, resources can be allocated according to the amount of data to be transmitted and a channel state in data service. Accordingly, a scheduler can allocate transmission resources, taking into account the amount of resources used for data transmission, a channel state, and the amount of data in a wireless communication system such as a mobile communication system. The same thing can apply to an LTE system as a future-generation mobile communication system. Thus, a scheduler of an evolved Node B (eNB or eNode B) can manage and allocate resources in the LTE system. An evolution of LTE, LTE-Advanced (LTE-A) that increases transmission rates by applying various new techniques to LTE is under active discussion. One of the new techniques can be Coordinated Multi-Point (CoMP). CoMP is a transmission scheme in which a plurality of cells transmit signals through cooperation to a UE that can be relatively remote from an eNB or experiences severe interference from a neighbor cell.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for performing a Radio Resource Control (RRC) operation in a User Equipment (UE), when an RRC layer of the UE receives a Physical Uplink Control Channel (PUCCH)/Sounding Reference Signal (SRS) release request from a Medium Access Control (MAC) layer of the UE in a Coordinated Multi-Point (CoMP) wireless mobile communication system.

In accordance with an aspect of the present disclosure, there is provided a method for configuring configuration information with a user equipment in a mobile communication system. The method includes determining, upon receipt of a PUCCH/SRS release request from a lower layer, whether configuration information required for a transmission mode supporting CoMP has been configured, and if the configuration information has been configured, reconfiguring a setting state of the configuration information.

In accordance with another aspect of the present disclosure, there is provided a user equipment for configuring configuration information in a mobile communication system. The user equipment includes a controller configured to, upon receipt of a PUCCH/SRS release request from a lower layer through a transceiver, determine whether configuration information required for a transmission mode supporting CoMP has been configured and, if the configuration information has been configured, to reconfigure a setting state of the configuration information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
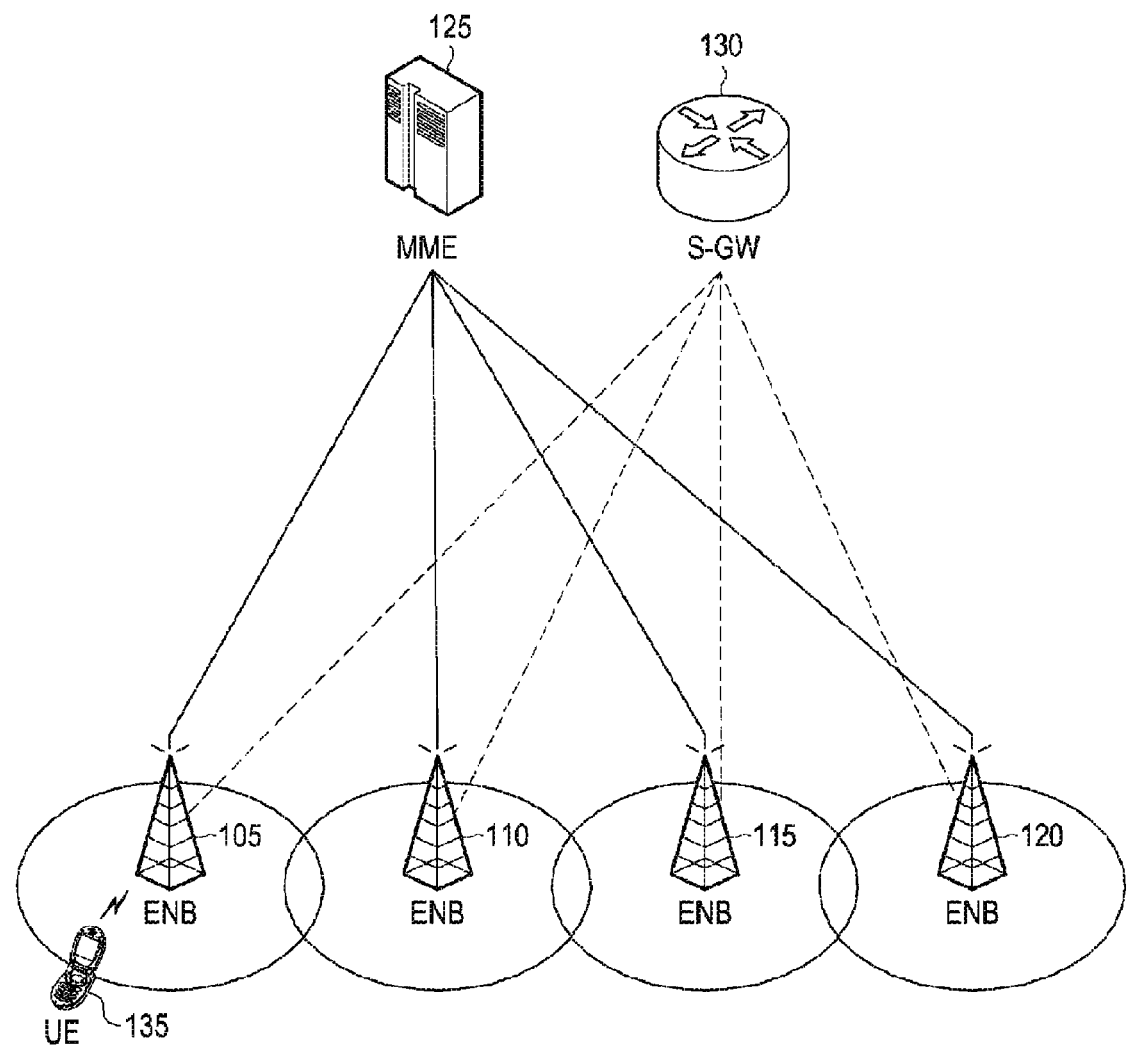
FIG. 1 illustrates an example configuration of a general $3^{rd}$ Generation Partnership Project (3GPP) Long Term Evolution (LTE) system according to this disclosure.

FIG. 1 illustrates an example configuration of a general 3$^{rd}$ Generation Partnership Project (3GPP) Long Term Evolution (LTE) system according to this disclosure.

Referring to FIG. 1, a Radio Access Network (RAN) of the 3GPP LTE system can include evolved Node Bs (eNBs, or eNode Bs) 105, 110, 115, and 120, a Mobility Management Entity (MME) 125, and a Serving GateWay (S-GW) 130. A User Equipment (UE) 135 can be connected to an external network, for example, through the eNB 105 and the S-GW 130. The eNBs 105, 110, 115, and 120 can correspond to Node Bs in a Universal Mobile Telecommunications System (UMTS). Each of eNBs 105, 110, 115, and 120 can be connected to a UE through a radio channel and play a more complex role than a Node B. In LTE, all user traffic including a real-time service such as Voice over Internet Protocol (VoIP) can be serviced on a shared channel. Therefore, an entity that collects state information about UEs and schedules the UEs can be needed and each of the eNBs 105, 110, 115, and 120 can serve as such a scheduling entity. Typically, one eNB can manage a plurality of cells. To achieve a data rate of up to 100 Mpbs, the LTE system can adopt Orthogonal Frequency Division Multiplexing (OFDM) as a radio access technology in a bandwidth of up to 20 MHz. In addition, the LTE system can use Adaptive Modulation and Coding (AMC) in which a modulation scheme and a channel coding rate are determined for a UE adaptively according to a channel state of the UE. The S-GW 130 can be an entity that provides a data bearer. The S-GW 130 can generate or release a data bearer under the control of the MME 125. The MME 125 can be an entity that is connected to a plurality of eNBs and performs various control functions.

Figure 2:
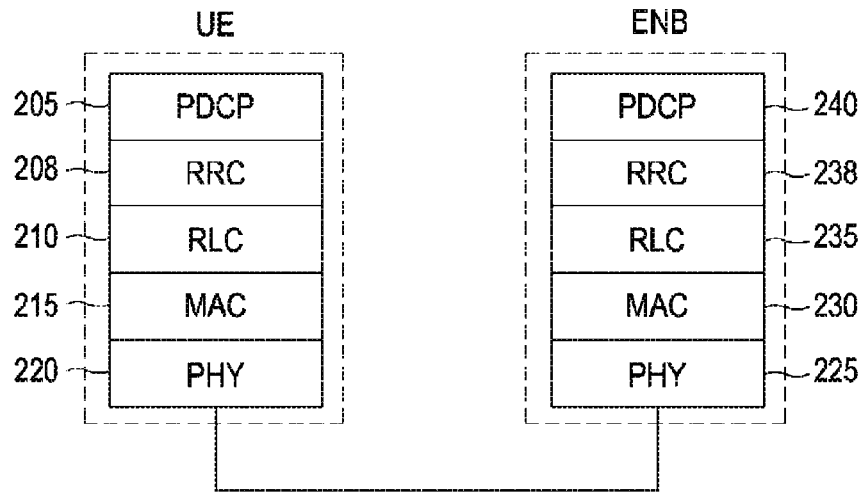
FIG. 2 illustrates an example radio protocol architecture in a general 3GPP LTE system according to this disclosure.

FIG. 2 illustrates an example radio protocol architecture in a general 3GPP LTE system according to this disclosure. Referring to FIG. 2, a radio protocol stack for each of a UE and an eNB in the LTE system can include a Packet Data Convergence Protocol (PDCP) layer 205 or 240, a Radio Resource Control (RRC) layer 208 or 238, a Radio Link Control (RLC) layer 210 or 235, a Medium Access Control (MAC) layer 215 or 230, or a Physical layer (PHY) 220 or 225.

The PDCP layers 205 and 240 can be responsible for Internet Protocol (IP) header compression/decompression, ciphering and integrity protection check on a radio protocol, or the like. The RRC layers 208 or 238 can define transmission of control information/messages for handling radio resources from a higher layer or a related operation/procedure. The RLC layers 210 or 235 can reconfigure a PDCP Packet Data Unit (PDU) to an appropriate size. The MAC layer can be connected to a plurality of RLC entities. The MAC layer can multiplex RLC PDUs into a MAC PDU or demultiplex RLC PDUs from a MAC PDU. The PHY layer 220 or 225 can generate an OFDM symbol by channel-encoding and modulating higher-layer data. The PHY layer 220 or 225 can transmit the OFDM symbol on a radio channel or demodulate and channel-decode an OFDM symbol received on a radio channel. The PHY layer 220 or 225 can transmit the channel-decoded OFDM symbol to a higher layer.

Figure 3:
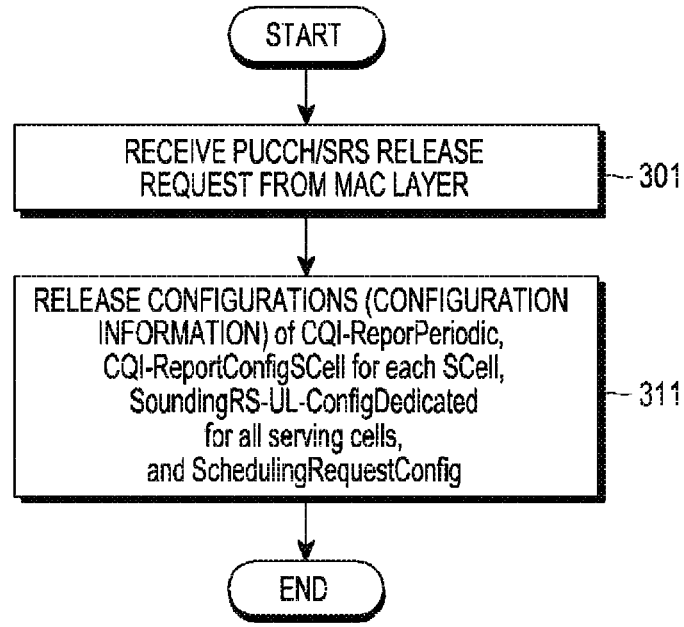
FIG. 3 illustrates an example general Radio Resource Control (RRC) operation in response to a Physical Uplink Control Channel (PUCCH)/Sounding Reference Signal (SRS) release request received from a Medium Access Control (MAC) layer according to this disclosure.

FIG. 3 illustrates an example general Radio Resource Control (RRC) operation in response to a Physical Uplink Control Channel (PUCCH)/Sounding Reference Signal (SRS) release request received from a Medium Access Control (MAC) layer according to this disclosure. For the convenience of description, the RRC operation will be described based on the radio protocol architecture illustrated in FIG. 2, by way of example.

Referring to FIG. 3, it can be assumed that Transmission Mode 10 (TM10) supporting Coordinated Multi-Point (CoMP) has not been configured for the UE. For example, if the MAC layer 215 of the UE senses failure of an uplink transmission, the MAC layer 215 can transmit a Physical Uplink Control Channel (PUCCH)/Sounding Reference Signal (SRS) release request to the RRC layer 208 of the UE. The failure of the uplink transmission can be sensed upon an occurrence of an event (such as expiration of a timer) used to determine the validity of an uplink transmission timing for an uplink transmission or the number of transmissions of an uplink Scheduling Request (SR) message exceeding a maximum transmission number. That is, upon an occurrence of such an event, the MAC layer 215 can transmit the PUCCH/SRS release request to the RRC layer 208 in the UE.

Upon receipt of the PUCCH/SRS release request from the MAC layer 215 in operation 301, the RRC layer 208 can release configuration information in response to the PUCCH/SRS release request in operation 311. Specifically, the RRC layer 208 can release a configuration (such as configuration information) of CQI-ReportPeriodic in operation 311. If a Secondary Cell (SCell) can be configured/set for the UE and CQI-ReportConfigSCell can be configured/set for the SCell, a configuration (such as configuration information) of CQI-ReportConfigSCell is released. In addition, a configuration (such as configuration information) of SoundingRS-UL-ConfigDedicated configured/set for all of one or more serving cells and a configuration (such as configuration information) of SchedulingRequestConfig can be released. The configuration (such as configuration information) of CQI-ReportPeriodic can be resource configuration information used for the UE to periodically transmit a Channel Quality Indicator (CQI) of a downlink channel on an uplink, so that an eNB can refer to the CQI in applying AMC during downlink scheduling. The configuration (such as configuration information) of CQI-ReportConfigSCell can be resource configuration information used to periodically transmit a CQI of a downlink channel on an SCell on the uplink. The configuration (such as configuration information) of SoundingRS-UL-ConfigDedicated can be resource configuration information about an uplink SRS that the UE periodically transmits on the uplink, so that the eNB can refer to the SRS in uplink scheduling. The configuration (such as configuration information) of SchedulingRequest-Config can be resource configuration information for a periodic uplink SR message allocated to the UE.

Figure 4:
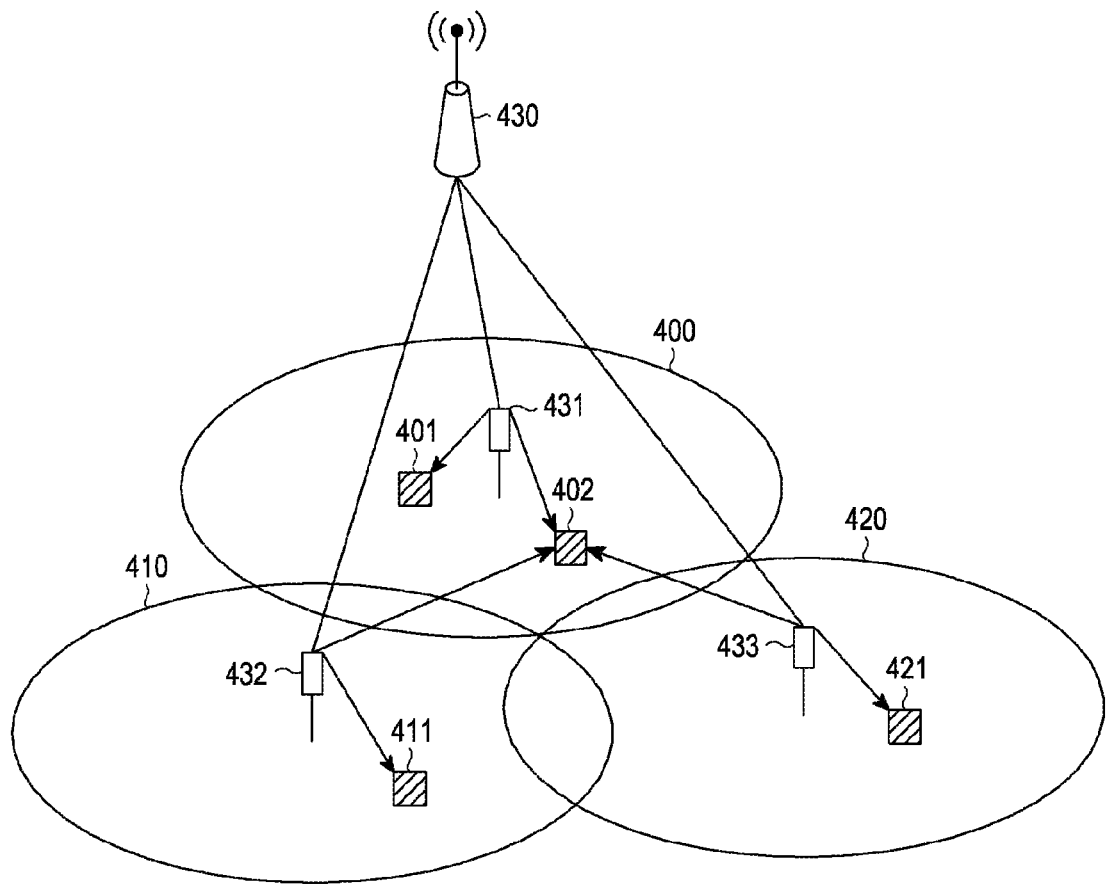
FIG. 4 illustrates an example configuration of a Coordinated Multi-Point (CoMP) wireless communication system according to this disclosure.

FIG. 4 illustrates an example configuration of a Coordinated Multi-Point (CoMP) wireless communication system according to this disclosure. Referring to FIG. 4, the CoMP wireless communication system can include a plurality of cells, for example, three cells 400, 410, and 420 (Cell 1, Cell 2, and Cell 3). The CoMP wireless communication system can also include a plurality of UEs that can receive downlink data from their nearest cells without using CoMP. For example, three UEs 401, 411, and 421 (UE 1, UE 2, and UE 3), or a UE 402 (UE 4) can receive downlink data from Cell 1, Cell 2, and Cell 3. Each of the UE 1, UE 2, and UE 3 can estimate a channel state using a Reference Signal (RS) For example, a Channel State Information Reference Signal (CSI-RS) can be received from its serving cell and can transmit feedback data including a channel state estimate to a central controller 430.

The central controller 430 will be described in brief. A cell can be a data transmission area that can be serviced by a specific transmission point. The transmission point can be a Remote Radio Head (RRH) sharing the same Cell Identifier (Cell-ID) with a macro eNB in a macro area. The cell can also be a macro cell or a pico cell, in which each transmission point can have a different Cell-ID. Accordingly, the central controller 430 can be an entity, such as an eNB, that can transmit/receive data to/from a UE and process the transmission data/received data. If the transmission point is an RRH sharing the same Cell-ID with a macro eNB, then the macro eNB can serve as the central controller 430. If the transmission point is a macro cell or a pico cell having a different Cell-ID, an entity that manages macro cells or pico cells in an integrated manner can serve as the central controller 430. In FIG. 4, each of Cell 1, Cell 2, and Cell 3 can include an eNB. Specifically, Cell 1 can include a first eNB 431 (eNB 1), Cell 2 can include a second eNB 432 (eNB 2), and Cell 3 can include a third eNB 433 (eNB 3). The eNBs 431, 432, and 433 can communicate with the central controller 430.

UE 4 can receive downlink data from Cell 1, Cell 2, and Cell 3 in CoMP and can estimate the channel state of each cell using a CSI-RS received from the cell. Therefore, the central controller 430 can allocate three CSI-RS resources corresponding to Cell 1, Cell 2, and Cell 3 to UE 4, for channel state estimation at UE 4. The CSI-RS resources can refer to resources in which CSI-RSs are transmitted.

Figure 5:
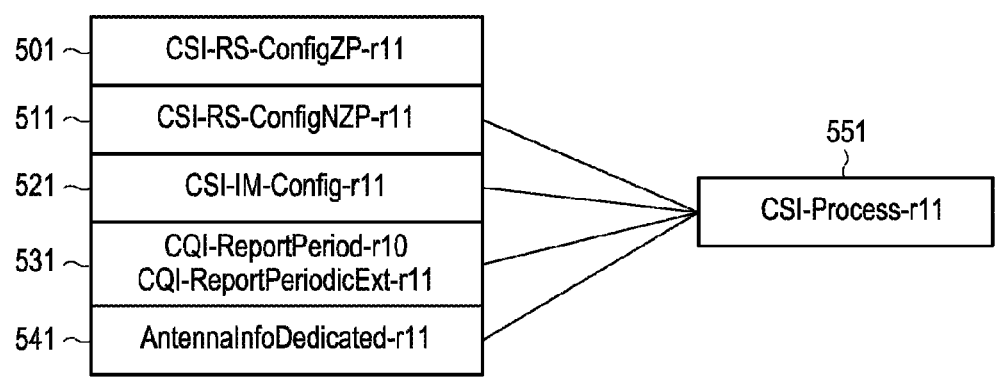
FIG. 5 illustrates an example of Information Elements (IEs) configured for a User Equipment (UE) configured with Transmission Mode 10 (TM10) supporting CoMP according to this disclosure.

FIG. 5 illustrates an example of Information Elements (IEs) configured for a User Equipment (UE) configured with Transmission Mode 10 (TM10) supporting CoMP according to this disclosure. For TM10 supporting CoMP, an eNB can configure the following configuration information (such as channel configuration information) for the UE. Specifically, the configuration information (such as channel configuration information) can include CSI-RS-ConfigZP-r11 501, CSI-RS-ConfigNZP-r11 511, CSI-IM-Config-r11 521, CQI-ReportPeriod-r10, CQI-ReportPeriodExt-r11 531, AntennaInfoDedicated-r11 541, or CSI-Process-r11 551. The CQI-ReportPeriod-r10 can be channel configuration information for periodic CQI reporting already existing before the introduction of TM10 or the other information which could have been newly introduced for TM10 of release 11. The CSI-RS-ConfigZP-r11 501 can be a CSI-RS resource configuration (information) for which the UE assumes zero transmission power. The CSI-RS-ConfigZP-r11 501 can indicate no data mapping to corresponding resources. The eNB can configure/set the CSI-RS-ConfigZP-r11 501 for a serving frequency. The CSI-RS-ConfigZP-r11 501 can include the following detailed information. [Table 1] illustrates example CSI-RS-ConfigZP IEs and [Table 2] illustrates example CSI-RS-ConfigZP field descriptions.

TABLE 1

CSI-RS-ConfigZP information elements

-- ASN1START
CSI-RS-ConfigZP-r11 ::=    SEQUENCE {
    csi-RS-IdentityZP-r11        CSI-RS-IdentityZP-r11,
    resourceConfigList-r11       BIT STRING (SIZE (16)),
    subframeConfig-r11           INTEGER (0..154)
}
-- ASN1STOP

TABLE 2

CSI-RS-ConfigZP field descriptions resourceConfigList
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].

TS 36.211/36.213[ . . . ] in the field description of an IE can indicate the 3GPP TS 36.211/36.213 standard and a section or table in [ . . . ] can be referred to for detailed information about a parameter. The same format can apply to other configuration information.

The CSI-RS-ConfigNZP-r11 511 can indicate a CSI-RS configuration (such as configuration information) for which the UE uses non-zero transmission power, for CSI-RS channel estimation. The eNB can also configure/set the CSI-RS-ConfigNZP-r11 511 for the serving frequency. The CSI-RS-ConfigNZP-r11 511 can include the following detailed information.

TABLE 3

CSI-RS-ConfigNZP information elements

```
--ASN1START
CSI-RS-ConfigNZP-r11 ::=    SEQUENCE {
    csi-RS-IdentityNZP-r11      CSI-RS-IdentityNZP-r11,
    antennaPortsCount-r11       ENUMERATED {an1, an2, an4, an8},
    resourceConfig-r11          INTEGER (0..31),
    SubframeConfig-r11          INTEGER (0..154),
    scramblingIdentity-r11      INTEGER (0..503),
    qcl-CRS-Info-r11            SEQUENCE {
        qcl-ScramblingIdentity-r11    INTEGER (0-503),
        crs-PortsCount-r11            ENUMERATED {n1, n2, n4, spare1},
        mbsfn-SubframeConfig-r11      MBSFN-SubframeConfig       OPTIONAL -- Need OR
    }                                                            OPTIONAL, -- Need OR
    ...
}
-- ASN1STOP
```

CSI-RS-ConfigNZP field description examples are given in [Table 4].

TABLE 4

CSI-RS-ConfigNZP field descriptions antennaPortsCount
Parameter represents the number of antenna ports used for transmission of CSI reference signals where an1 corresponds to 1, an2 to 2 antenna ports etc. see TS 36.211 [21, 6.10.5].
qcl-CRS-Info
EUTRAN configures this field if and only if the UE is configured with qcl-Operation set to typeB.
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
scramblingIdentity
Parameter xxx, see TS 36.211 [21, xxx].

The CSI-IM-Config-r11 521 can be a Channel State Information-Interference Measurement (CSI-IM) resource configuration (information) that the eNB can configure/set for the serving frequency. The UE can use CSI-IM resources in measuring interference with a downlink channel and the CSI-IM resource configuration (such as configuration information) can be included in a channel state estimate. For more information, refer to 3GPP TS 36.211/213. [Table 5] provides example detailed information included in the CSI-IM-Config-r11 521.

TABLE 5

CSI-IM-Config information elements

```
-- ASN1START
CSI-IM-Config-r11 ::=    SEQUENCE {
    csi-im-Identity-r11         CSI-IM-Identity-r11,
    resourceConfig-r11          INTEGER (0..15),
    subframeConfig-r11          INTEGER (0..154),
    ...
}
-- ASN1STOP
```

[Table 6] below illustrates CSI-IM-Config field description examples.

TABLE 6

CSI-IM-Config field descriptions resourceConfig
Parameter: CSI-IM configuration, see TS 36.211 [21, table 6.10.5.2-1 and 6.10.5.2-2] for 4 REs.
subframeConfig
Parameter: $I_{CSI-RS}$, see TS 36.211 [21, table 6.10.5.3-1].

The CQI-ReportPeriodExt-r11 531 can be a configuration (information) added to configuration information for periodic CQI reporting of the UE, that is, CQI-ReportPeriod-r10, in order to support TM10. The eNB can configure/set the CQI-ReportPeriodExt-r11 531 for the serving frequency. The CQI-ReportPeriodExt-r11 531 can include detailed information examples illustrated in [Table 7] and 3GPP TS 36.331/36.211/36.213 can be referred to for details of the CQI-ReportPeriodExt-r11 531.

TABLE 7

```
CQI-ReportPeriodicExt-r11 ::=        SEQUENCE {
    cqi-ReportPeriodicExtId-r11          CQI-ReportPeriodicExtId-r11,
    cq-pmi-ConfigIndex-r11                   INTEGER (0..1023),
    cqi-FormatIndicatorPeriodic-r11      CHOICE {
        widebandCQI-r11                          SEQUENCE {
            csi-ReportMode-r11                       ENUMERATED {submode1, submode2} OPTIONAL -- Need OR
        },
        subbandCQI-r11                           SEQUENCE {
            k                                        INTEGER (1..4),
            periodicityFactor-r11                    ENUMERATED {n2, n4}
        }
    },
    ri-ConfigIndex-r11                       INTEGER (0..1023)                      OPTIONAL, -- Need OR
    csi-ConfigIndex-r11                      CHOICE {
        release                                  NULL,
        setup                                    SEQUENCE {
            cqi-pmi-ConfigIndex2-r11                 INTEGER (0..1023),
            ri-ConfigIndex2-r11                      INTEGER (0..1023)   OPTIONAL         -- Need OR
        }
    }                                                                               OPTIONAL, -- Need ON
    ...
}
```

The AntennaInfoDedicated-r11 541 can include transmissionMode, codebookSubsetRestriction, or the like, which can be configured for TM10. TS 36.331/36.211/36.213 can be referred to for details of the AntennaInfoDedicated-r11 541.

The CSI-Process-r11 551 can specify a reporting unit in which the UE can report a CQI, for TM10. The configuration of the CSI-Process-r11 551 can be linked to information such as the CSI-IM-Config-r11 521. The eNB can configure/set the CSI-Process-r11 551 for the serving frequency. TS 36.331/36.211/36.213 can be referred to for details of a CSI Process. The CSI-Process-r11 551 can include the following detailed information.

TABLE 8

CSI-Process information elements

```
-- ASN1START
CSI-Process-r11 ::=            SEQUENCE {
    csi-ProcessIdentity-r11        CSI-ProcessIdentity-r11,
    csi-RS-IdentityNZP-r11         CSI-RS-IdentityNZP-r11,
    csi-IM-Identity-r11            CSI-IM-Identity-r11,
    p-C-AndAntennaInfoDedList-r11  SEQUENCE (SIZE (1..2)) OF P-C-AndAntennaInfoDed-r11,
    cqi-ReportBothPS-r11           CQI-ReportBothPS-r11                OPTIONAL, -- Need OR
    cqi-ReportPeriodicId-r11       INTEGER (0..maxCQI-Ext-r11)         OPTIONAL, -- Need OR
    cqi-ReportAperiodicPS-r11      CQI-ReportAperiodicPS-r11           OPTIONAL, -- Need OR
    ...
}
P-C-r11 ::=                    INTEGER (-8..15)
P-C-AndAntennaInfoDed-r11::=   SEQUENCE {
    p-C-r11                        P-C-r11,
    antennaInfoDedConfigId-r11     AntennaInfoDedConfigId-r11
}
-- ASN1STOP
```

CSI-Process field description examples that can be included in the CSI-Process-r11 551 are illustrated in [Table 9] below.

TABLE 9

CSI-Process field descriptions antennaInfoDedConfigId
Refers to a dedicated antenna info configuration that is configured for the same frequency as the CSI process.
csi-IM-Identity
Refers to a CSI-IM configuration that is configured for the same frequency as the CSI process.
csi-RS-IdentityNZP
Refers to a CSI RS configuration that is configured for the same frequency as the CSI process.
cqi-ReportBothPS
Includes CQI configuration parameters applicable for both aperiodic and periodic CSI reporting, for which CSI process specific values may be configured. E-URAN configures the field if and only if cqi-ReportPeriodicId is included and/ or if cqi-ReportAperiodicPS is included and set to setup.

TABLE 9-continued

CSI-Process field descriptions cqi-ReportPeriodicId
Refers to a periodic CQI reporting configuration that is configured for the same frequency as the CSI process. Value o refers
to the set of parameters defined by the REL-10 CQI reporting configuration fields, while the other values refer to the
additional configurations E-UTRAN assigns by CQI-ReportPeriodicExt-r11 (and as covered by CQI-ReportPeriodicExtId).
p-C
Parameter: $P_c$, see TS 36.213 [23, 7.2.5].
p-C-AndAntennaInfoDedList
A p-C-AndAntennaInfoDedList including 2 entries indicates that the subframe patterns configured for CSI (CQI/PMI/PTI/RI)
reporting (i.e. as defined by field csi-MeasSubframeSet1 and csi-MeasSubframeSet2) are to be used for this CSI process, while
a single entry indicates that the subframe patterns are not to be used for this CSI process. E-UTRAN does not include 2
entries in p-C-AndAntennaInfoDedList for CSI processes concerning a secondary frequency. E-UTRAN includes 2 entries in p-C-
AndAntennaInfoDedList when configuring both cqi-pmi-ConfigIndex and cqi-pmi-ConfigIndex2.

Figure 6:
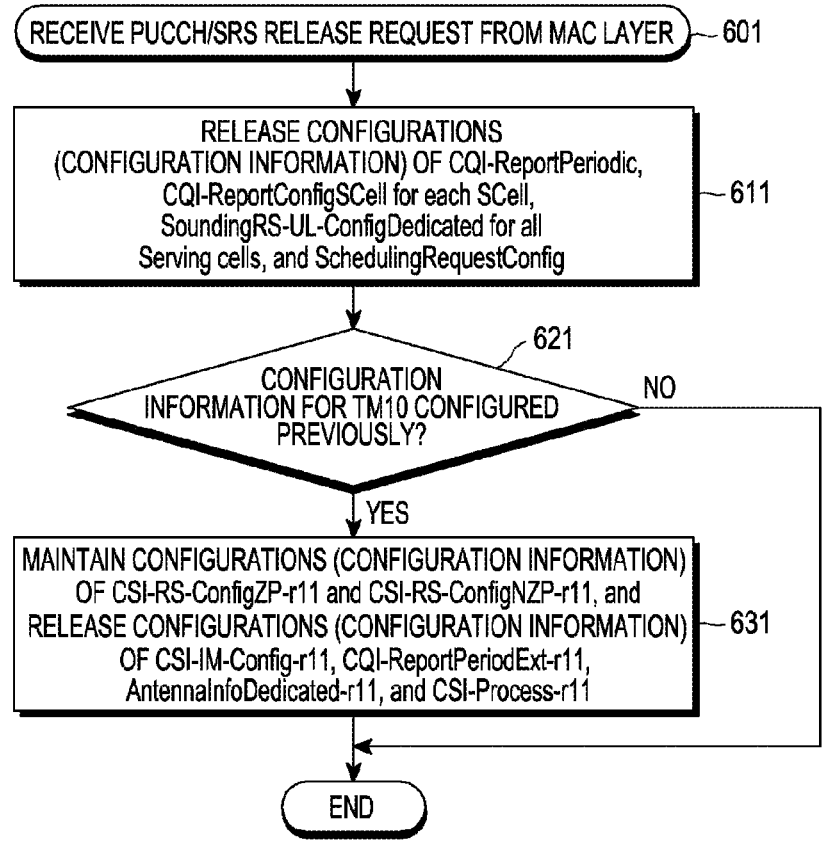
FIG. 6 illustrates an example of RRC operation in response to a PUCCH/SRS release request received from a MAC layer in a UE configured with TM10 supporting CoMP according to this disclosure.

FIG. 6 illustrates an example of RRC operation in response to a PUCCH/SRS release request received from a MAC layer in a UE configured with TM10 supporting CoMP according to this disclosure. Referring to FIG. 6, upon sensing failure of an uplink transmission, at operation 601, a MAC layer of the UE can transmit a PUCCH/SRS release request to an RRC layer of the UE. The failure of the uplink transmission can be sensed in the same manner as described before with reference to FIG. 3 and will not be described again herein to avoid redundancy. That is, upon occurrence of an event described with reference to FIG. 3, the UE can transmit the PUCCH/SRS release request from the MAC layer to the RRC layer, determining that the uplink transmission has failed.

Upon receipt of the PUCCH/SRS release request from the MAC layer in operation 601, the RRC layer can release configuration information in response to the PUCCH/SRS release request in operation 611. Specifically, the UE can release a configuration (such as configuration information) of CQI-ReportPeriodic. If an SCell can be configured/set for the UE and CQI-ReportConfigSCell can be configured/set for the SCell, a configuration (such as configuration information) of CQI-ReportConfigSCell can be released. In addition, a configuration (such as configuration information) of SoundingRS-UL-ConfigDedicated configured/set for all serving cell(s) and a configuration (such as configuration information) of SchedulingRequestConfig can be released. In operation 621, the UE can determine whether corresponding configuration information (such as CSI-IM-Config-r11, CQI-ReportPeriodExt-r11, AntennaInfoDedicated-r11, CSI-Process-r11, CSI-RS-ConfigZP-r11, or CSI-RS-ConfigNZP-r11) has been configured for TM10. If the corresponding configuration information has been configured for TM10, in operation 631, the UE can release the configurations (such as configuration information) of CSI-IM-Config-r11, CQI-ReportPeriodExt-r11, AntennaInfoDedicated-r11, or CSI-Process-r11 without releasing the configurations (such as configuration information) of CSI-RS-ConfigZP-r11 or CSI-RS-ConfigNZP-r11. Since CSI-RS-ConfigZP-r11 and CSI-RS-ConfigNZP-r11 can be used for reception of a Physical Downlink Shared Channel (PDSCH) (such as for received PDSCH rate-matching), the UE cannot release CSI-RS-ConfigZP-r11 and CSI-RS-ConfigNZP-r11 even when the UE can sense failure of an uplink transmission and the configuration information can be related to uplink channel quality reporting.

On the contrary, if the configuration information has not been configured in operation 621, the UE can ends the procedure.

Figure 7:
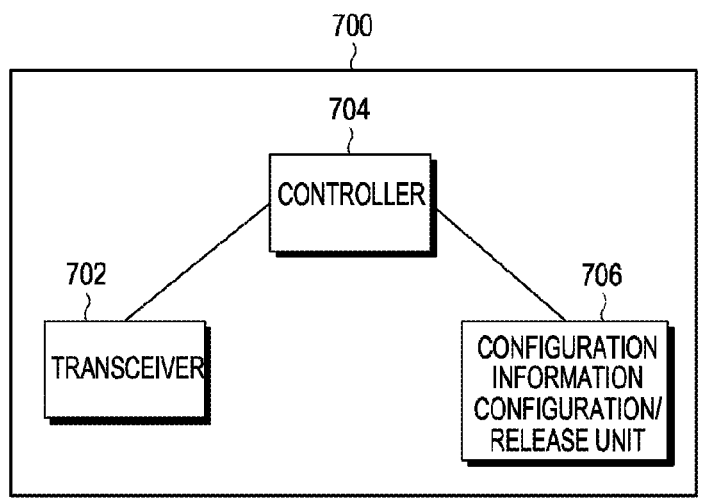
FIG. 7 illustrates an example configuration of an RRC layer in a UE according to this disclosure.

FIG. 7 illustrates an example configuration of an RRC layer in a UE according to this disclosure. Referring to FIG. 7, a UE 700 can include a transceiver 702, a controller 704, or a configuration information configuration/release unit 706. While the UE 700 can include sub-units needed to implement embodiments of the present disclosure, two or more of the sub-units can be incorporated into a single sub-unit or one of the sub-units may be divided into a plurality of sub-units.

Upon sensing failure of an uplink transmission through a MAC layer, the controller 704 can control transmission of a PUCCH/SRS release request to an RRC layer through the transceiver 702. The failure of the uplink transmission can be sensed in the same manner as described before with reference to FIG. 3 and thus how failure of an uplink transmission can be sensed will not be described in detail again herein.

Upon sensing receipt of the PUCCH/SRS release request from the MAC layer at the RRC layer, the controller 704 can control the release of configuration information according to the PUCCH/SRS release request through the configuration information configuration/release unit 706. Specifically, the configuration information configuration/release unit 706 can release a configuration (such as configuration information) of CQI-ReportPeriodic. If an SCell can be configured/set for the UE and CQI-ReportConfigSCell can be configured/set for the SCell, the controller 704 can control the release of a configuration (such as configuration information) of CQI-ReportConfigSCell through the configuration information configuration/release unit 706. In addition, the configuration information configuration/release unit 706 can release a configuration (such as configuration information) of SoundingRS-UL-ConfigDedicated configured/set for all one or more serving cells and a configuration (such as configuration information) of SchedulingRequestConfig. The controller 704 can determine whether the following corresponding configuration information (CSI-IM-Config-r11, CQI-ReportPeriodExt-r11, AntennaInfoDedicated-r11, CSI-Process-r11, CSI-RS-ConfigZP-r11 or CSI-RS-ConfigNZP-r11) has been configured for TM10. If the corresponding configuration information has been configured for TM10, the controller 704 can control the configuration information configuration/release unit 706 in the following manner. The configuration information configuration/release unit 706 can release configurations (such as configuration information) of CSI-IM-Config-r11, CQI-ReportPeriodExt-r11, AntennaInfoDedicated-r11, or CSI-Process-r11 without releasing configurations (such as configuration information) of CSI-RS-ConfigZP-r11 or CSI-RS-ConfigNZP-r11. Since CSI-RS-ConfigZP-r11 and CSI-RS-ConfigNZP-r11 can be used for reception of a PDSCH (such as for received PDSCH rate-matching), the controller 704 can control the configuration information configuration/release unit 706 not to release CSI-RS-ConfigZP-r11 or CSI-RS-ConfigNZP-r11 even when the UE can sense failure in an uplink transmission and the configuration information can be related to uplink channel quality reporting.

The proposed method and apparatus for configuring configuration information at a UE in a mobile communication system may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for releasing a radio resource by a user equipment (UE) in a wireless communication system, the method comprising:
   receiving, from a lower layer, a release request for a physical uplink control channel; and
   releasing a radio resource for a channel quality indicator (CQI) report based on the release request;
   wherein if a predetermined transmission mode is configured for a serving cell, the radio resource for the CQI report comprises a radio resource for a periodic CQI report.

2. The method of claim 1, wherein the predetermined transmission mode comprises a transmission mode 10.

3. The method of claim 1, wherein if the predetermined transmission mode is configured for the serving cell, the radio resource for the CQI report further comprises a radio resource for channel state information (CSI) interference measurement (IM).

4. The method of claim 1, wherein the release request is related to the physical uplink control channel and a sounding reference signal (SRS).

5. The method of claim 1, wherein the radio resource for the CQI report further comprises at least one of a first CSI configuration resource, a second CSI configuration resource, and a third CSI configuration resource, the first CSI configuration resource for information providing resource configuration about a channel state information reference signal (CSI-RS) requiring non-zero transmission power, the second CSI configuration resource for information indicating a reporting unit of the CQI report, the third CSI configuration resource for providing a CSI-interference measurement (IM) resource.

6. A user equipment (UE) for releasing a radio resource in a wireless communication system, the UE comprising:
   a receiver configured to receive, from a lower layer, a release request for a physical uplink control channel; and
   a controller configured to release a radio resource for a channel quality indicator (CQI) report based on the release request;
   wherein if a predetermined transmission mode is configured for a serving cell, the radio resource for the CQI report comprises a radio resource for a periodic CQI report.

7. The UE of claim 6, wherein the predetermined transmission mode comprises a transmission mode 10.

8. The UE of claim 6, wherein if the predetermined transmission mode is configured for the serving cell, the radio resource for the CQI report further comprises a radio resource for channel state information (CSI) interference measurement (IM).

9. The UE of claim 6, wherein the release request is related to the physical uplink control channel and a sounding reference signal (SRS).

10. The UE of claim 6, wherein the radio resource for the CQI report further comprises at least one of a first CSI configuration resource, a second CSI configuration resource, and a third CSI configuration resource, the first CSI configuration resource for providing resource configuration information about a channel state information reference signal (CSI-RS) requiring non-zero transmission power, the second CSI configuration resource for indicating a reporting unit of the CQI report, the third CSI configuration resource for providing a CSI-interference measurement (IM) resource.

* * * * *